United States Patent [19]
Saucier

[11] 3,808,894
[45] May 7, 1974

[54] SPEEDOMETER LOCKING DEVICE
[75] Inventor: Len Saucier, New Westminster, British Columbia, Canada
[73] Assignee: Raymond Lee Organization, Inc., New York, N.Y. ; a part interest
[22] Filed: Jan. 10, 1973
[21] Appl. No.: 322,533

[52] U.S. Cl.................................. 73/491, 73/509
[51] Int. Cl........................ G01p 3/00, G01p 1/10
[58] Field of Search............. 73/491, 489, 509–511, 73/519; 324/180; 116/57, 116; 180/105 E, 105 R, 107, 103

[56] References Cited
UNITED STATES PATENTS
1,922,319  8/1933  Obidine ........................... 73/491 X
2,789,650  4/1957  Krous................................ 180/103
3,495,675  2/1970  Hass et al. ......................... 180/103

FOREIGN PATENTS OR APPLICATIONS
638,960  11/1936  Germany ............................ 73/491

Primary Examiner—James J. Gill
Attorney, Agent, or Firm—Daniel Jay Tick

[57] ABSTRACT

A speedometer locking device for locking the speedometer of a vehicle on impact comprises a position locking device for locking the speedometer in position. An actuating device connected to the position locking device operates the position locking device to lock the speedometer in position upon impact of the vehicle on extraordinary application of brake pressure.

3 Claims, 1 Drawing Figure

PATENTED MAY 7 1974 3,808,894
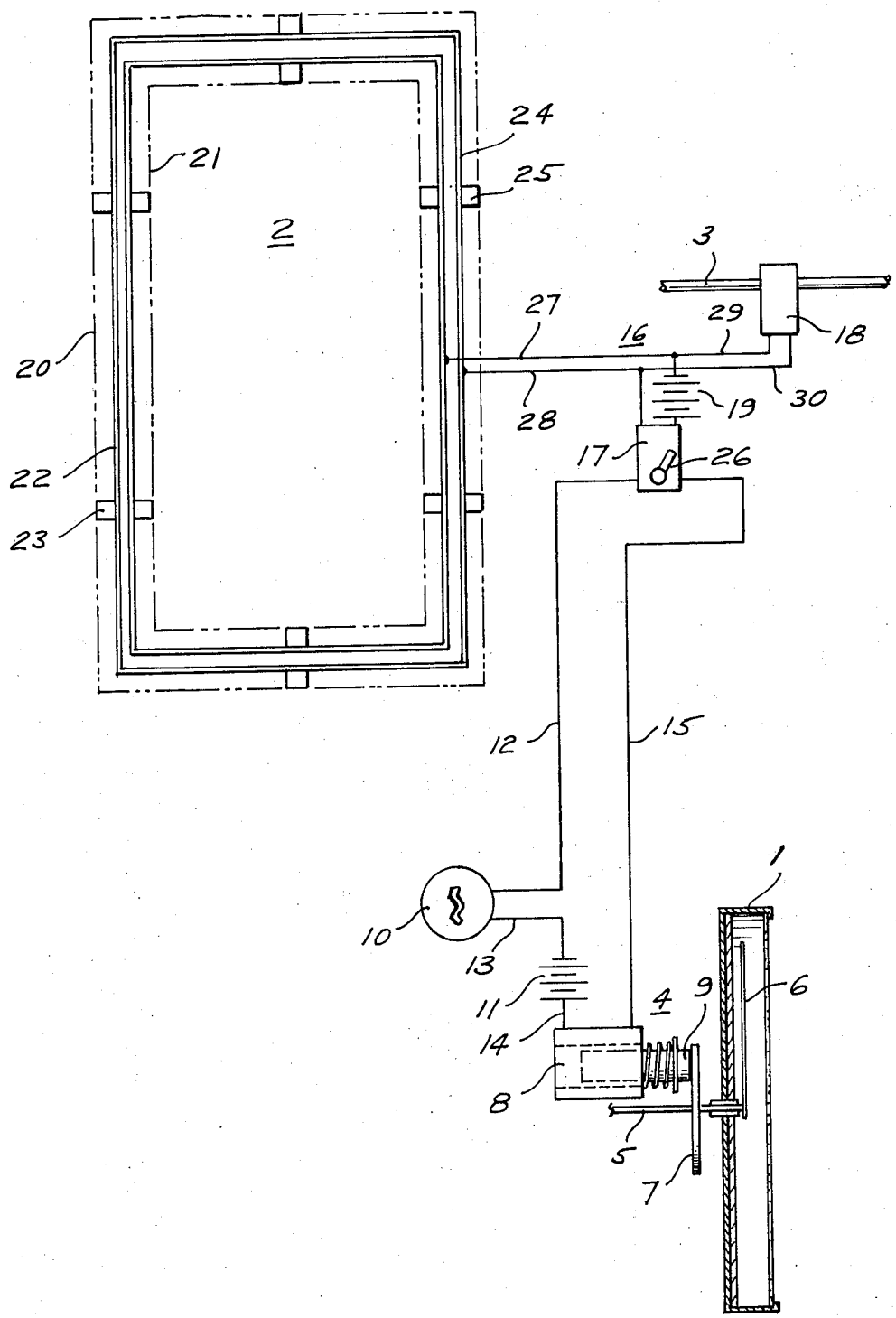

SPEEDOMETER LOCKING DEVICE

DESCRIPTION OF THE INVENTION

The present invention relates to a speedometer locking device. More particularly, the invention relates to a speedometer locking device for locking the speedometer of a vehicle on impact or the extraordinary application of brake pressure.

The principal object of the invention is to provide a speedometer locking device for locking the speedometer of a vehicle upon impact or the extraordinary application of brake pressure, which device operates with efficiency, effectiveness and reliability.

In order that the application may be readily carried into effect, it will now be described with reference to the accompanying drawing, wherein the single FIGURE is a circuit diagram of an embodiment of the speedometer locking device of the invention.

The speedometer locking device of the invention locks the speedometer 1 of a vehicle 2 on impact or the extraordinary application of brake pressure. The vehicle 2 also has brakes actuated through a brake fluid line 3.

A position locking device 4 locks the speedometer 1 in position. The speedometer 1 has a shaft 5 on which a speedometer indicator 6 is mounted. A speedometer disc 7 is affixed to and rotates with the shaft 5.

The position locking device 4 comprises a solenoid 8 and a locking bar 9 controlled by the solenoid for locking the speedometer disc 7 in position. A circuit, including an ignition switch 10, a source of voltage 11 and electrical conductors 12, 13, 14 and 15, is connected to the solenoid for maintaining the locking bar 9 spaced from the speedometer disc 7.

An actuating device 16 is connected to the position locking device 4 for operating the position locking device to lock the speedometer 1 in position upon impact of the vehicle 2 or extraordinary application of brake pressure. The actuating device 16 comprises a lock switch 17 in the circuit connected between the leads 12 and 15.

The lock switch 17 causes the circuit to operate the solenoid 8 to move the locking bar 9 into locking contact with the speedometer disc 7. The actuating device 16 comprises a fluid pressure switch 18 coupled to the brake fluid line 3 and actuated by extraordinary brake pressure. The fluid pressure switch 18 is connected to the lock switch 17 via a source of voltage 19.

The actuating device 16 also comprises an impact device actuated by abutment of the outer body 20 and inner frame 21 of the vehicle. The impact device comprises an electrical conductor 22 affixed to the outer body 20 by insulators 23, and so on, and an electrical conductor 24 affixed to the inner frame 21 by insulators 25, and so on. The conductors 22 and 24 of the impact device are connected to the lock switch 17 via the battery 19.

The lock switch 17 has a manual reset switch 26 for maintaining the circuit of the solenoid 8 closed. This maintains the locking bar 9 in spaced relation with the disc 7, so that the speedometer 1 operates freely.

When the vehicle is in collision during its operation with the ignition switch 10 closed, the body 20 and frame 21 come into contact and close the circuit 27, 28, 19 of the lock switch 17, thereby actuating said lock switch, which is normally inoperative. When the lock switch 17 is actuated, it opens the circuit of the solenoid 8. The spring-biased locking bar 9 is then moved into contact with the disc 7 and locks the speedometer indicator 6 in its position at the time of impact.

When the operator of the vehicle applies extraordinary brake pressure to the brakes of the vehicle, in the face of an impending collision, the circuit 29, 30, 19 of the lock switch 17 is closed by the fluid pressure switch 18. This actuates the lock switch 17, which then opens the circuit of the solenoid 8 to release the locking bar 9 into contact with the disc 7. This locks the speedometer in its position at the time of heavy brake application.

While the invention has been described by means of specific examples and in specific embodiments, I do not wish to be limited thereto, for obvious modifications will occur to those skilled in the art without departing from the spirit and scope of the invention.

I claim:

1. A speedometer locking device for locking the speedometer of a vehicle having a body, a frame, a speedometer and brakes on impact, said locking device comprising position locking means for locking the speedometer in position; and actuating means connected to the position locking means for operating the position locking means to lock the speedometer in position upon one of impact of the vehicle and extraordinary application of brake pressure, the actuating means comprising lock switch means for locking the speedometer, fluid pressure switch means actuated by extraordinary brake pressure, a source of voltage, said fluid pressure switch means being connected to the lock switch means via the source of voltage, and an impact device actuated by abutment of the body and frame of the vehicle, said impact device being connected to the lock switch means via the source of voltage.

2. A speedometer locking device as claimed in claim 1, wherein the speedometer has a shaft on which the speedometer indicator is mounted and a disc affixed to and rotating with the speedometer shaft and the position locking means comprises a solenoid and a locking bar controlled by the solenoid for locking the speedometer disc in position.

3. A speedometer locking device as claimed in claim 2, wherein the position locking means comprises a circuit connected to the solenoid for maintaining the locking bar spaced from the speedometer disc and the lock switch means of the actuating means is connected in the circuit for causing the circuit to operate the solenoid to move the locking bar into locking contact with the speedometer disc.

* * * * *